April 28, 1953

R. GRÉA ET AL 2,636,588

VARIABLE ESCAPEMENT

Filed Nov. 18, 1949

3 Sheets-Sheet 1

INVENTORS
RENÉ HIGONNET
LOUIS M. MOYROUD
RENÉ GRÉA
BY Kenway Jenney
Witter & Hildreth
ATTORNEYS

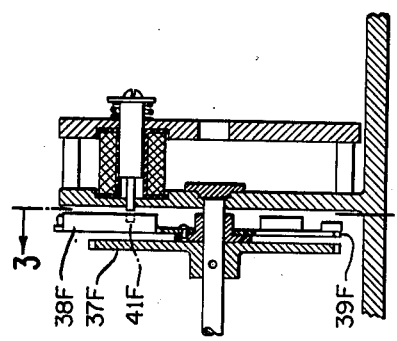
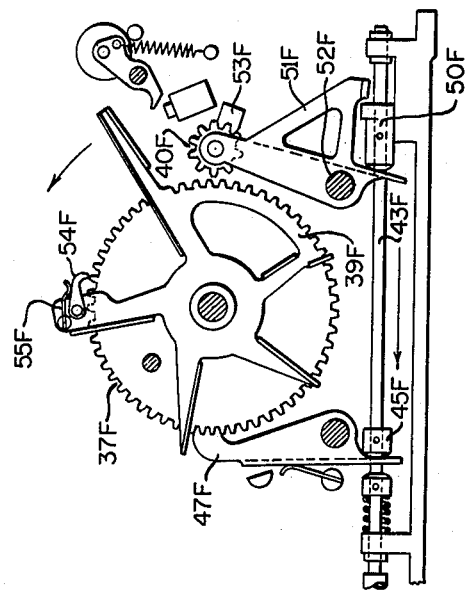
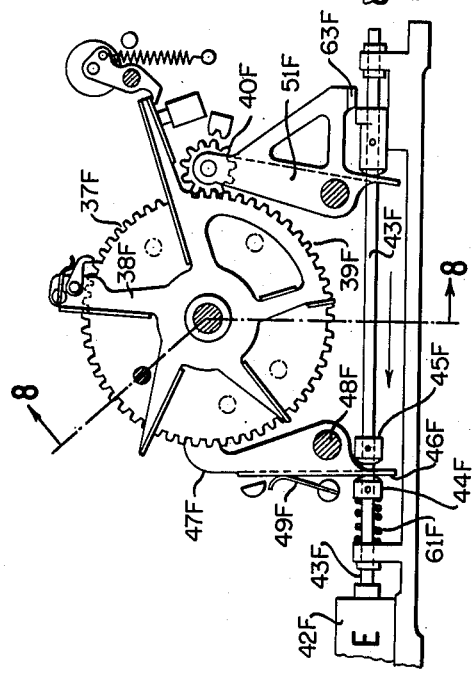

April 28, 1953

R. GRÉA ET AL 2,636,588

VARIABLE ESCAPEMENT

Filed Nov. 18, 1949

3 Sheets-Sheet 3

INVENTORS
RENÉ HIGONNET
LOUIS M. MOYROUD
RENÉ GRÉA
BY
ATTORNEYS

Patented Apr. 28, 1953

2,636,588

UNITED STATES PATENT OFFICE 2,636,588

VARIABLE ESCAPEMENT

René Gréa, Villeurbanne, France, and René Higonnet and Louis M. Moyroud, Cambridge, Mass., assignors to Graphic Arts Research Foundation, Inc., Cambridge, Mass., a corporation of Delaware Application November 18, 1949, Serial No. 128,162
In France November 24, 1948

5 Claims. (Cl. 197—90)

The present invention relates to variable advance mechanisms such as used for displacing photographic film in photographic type composing machines of the kind described in our copending applications Serial Nos. 610,336 and 770,320, filed August 11, 1945 and August 23, 1947, respectively.

The principal object of the present invention is to provide a variable escapement mechanism by which the extent of desired movement may be rapidly selected and the movement may be effected with exceptionally high precision. With this object in view, the invention comprises the variable escapement mechanism hereinafter described and particularly defined in the claims. The apparatus of the present invention is particularly suitable for use with composing apparatus of the type described in the above-mentioned applications, because of the precision required in such apparatus.

Figure 1:
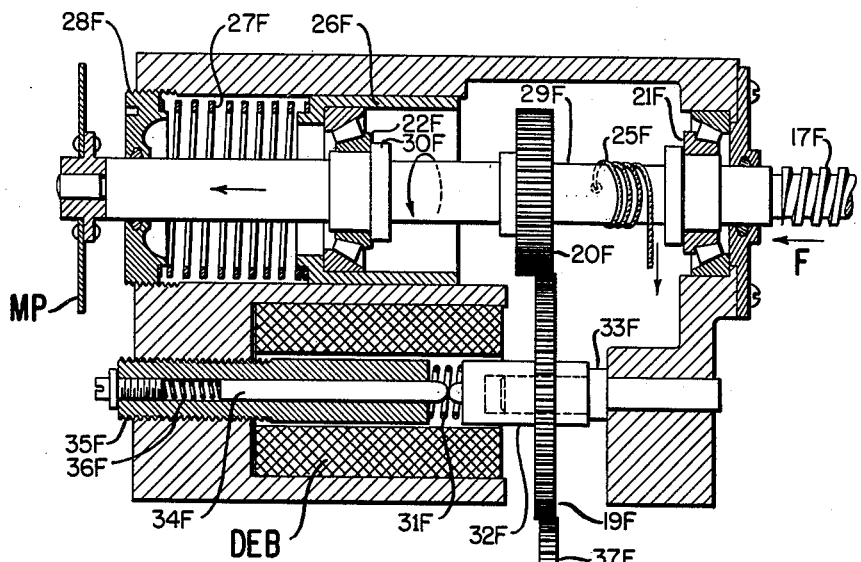
Figure 2:
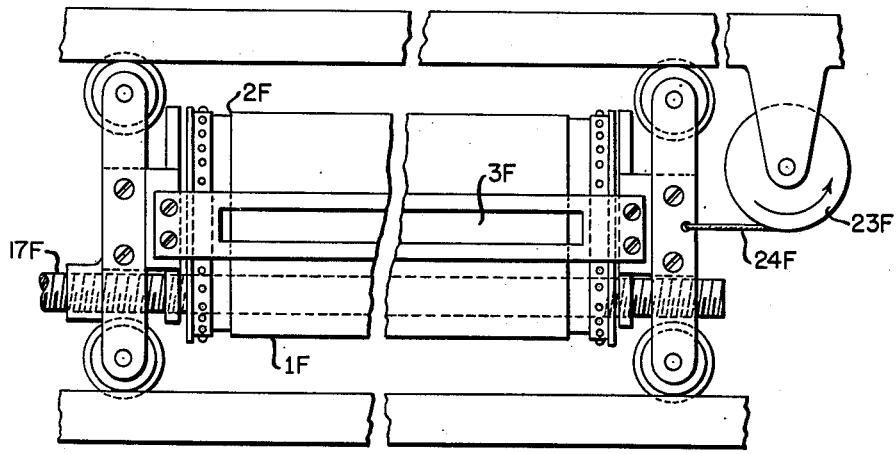

The invention will be described in relation to an embodiment in which Fig. 1 is a sectional elevation of the drive for the film carriage; Fig. 2 is an elevation of the film carriage; Figs. 3 to 7 are sectional elevations of the escapement, being taken generally on line 3—3 of Fig. 8; and Fig. 8 is a section on line 8—8 of Fig. 3.

Referring to Figs. 1 and 2, the sensitized film passing from a feed magazine to a take-up machine (not shown) is supported and fed by a sprocket 1F, a presser 3F, and a take-up sprocket 2F. Motions of the sprocket are used to advance the film for spacing between lines.

The lateral movement of the film during the photographing of a line is effected by a transverse movement of the carriage, controlled by a screw of relatively low pitch 17F (not reversible) which rotates under the control of a variable escapement to be described in detail presently. The escapement includes a gear wheel 37F which rotates, after each photographic exposure, through an angle corresponding to the width of the particular character photographed. This wheel meshes with a pinion 19F which itself meshes with a pinion 20F pinned on shaft 29F, which shaft carries the screw 17F. Conical roller bearings 21F and 22F are provided for the shaft 29F, and the rotary movement is transmitted to the film carriage in the direction of arrow F (Fig. 1).

The displacement of the carriage must be effected with utmost precision, of the order of .0005 of an inch. In order to reach this high degree of precision it is necessary to take up any backlash which may be present. This is accomplished by means of two springs which are also used for bringing the film carriage back to its rest position after the line has been photographed. One of these springs drives a wheel 23F (Fig. 2) and pulls the film carriage by means of a wire 24F in the direction of a return movement of the carriage. The other spring acts on screw 17F by means of a coiled wire 25F and tends to rotate this screw in the reverse direction.

Each time a character has been photographed, the film carriage is moved to the left a variable distance in a relatively short time. In order to obtain the required precision it is necessary to absorb the greater part of the shock due to stopping the carriage. To this effect a flexible arrangement has been provided, comprising a ring 26F which slides on the frame of the machine and presses against the conical bearing 22F. This ring is held in position by a powerful spring 27F whose tension may be adjusted by member 28F screwed into the frame. After each movement of the carriage, wheel 37F stops suddenly, and due to inertia, the carriage has a tendency to continue its movement. Owing to the pitch of the screw, a component of force would be applied in a rotative direction to the shaft 29F and this would result in a shock applied to the teeth of the wheel 37F. The effects of shocks thus applied to the wheel 37F and other parts of the escapement would be to affect their precision. According to the present invention, the longitudinal inertial force is applied to the thrust bearing 22F by a shoulder 30F of shaft 29F, and is transmitted to ring 26F which moves very slightly and compresses spring 27F. The spring then re-expands and restores the parts to exact position. The energy due to motion of the carriage is dissipated in friction, and there is no appreciable component of force that is transmitted to the gears of the escapement.

When one line has been completely photographed, electromagnet DEB is excited. This magnet pulls plunger 32F against spring 31F, and drives pinion 19F which slides on a rod 33F mounted on the frame of the machine. This pinion disengages itself from wheel 37F while remaining meshed with pinion 20F. As soon as pinion 19F is disengaged from wheel 37F, the springs acting on wire 25F and wheel 23F cause screw 17F to rotate in the direction opposed to its normal course of rotation, and bring the film carriage quickly back to its initial position for photographing the following line. Suitable mechanism may be provided for setting the carriage in a precise initial position, but such mechanism is described in our application Ser. No. 770,320 and forms no part of the present invention.

Under normal operating conditions pinion 19F is held meshed with wheel 37F by rod 34F which slides freely in a fixed member 35F and is constantly pushed by an adjustable spring 31F.

The variable escapement mechanism, which controls the advance of the film carriage, will now be described in relation to Figs. 3 to 7.

This variable escapement comprises the gear 37F meshing with the pinion 19F which controls the rotation of screw 17F of the film carriage, as above described. This gear rotates through a number of teeth, depending on the width of the character which has just been photographed, and it is under the control of a star piece 38F having several arms whose displacement is limited by pins or abutments 41F equal in number to the different possible advances. A toothed sector 39F on the star piece 38F can mesh with a pinion 40F. In the preferred embodiment, the pins 41F, as shown in Fig. 8, are arranged so that normally they lie beyond the path of movement of any of the arms of the star piece, but any one pin may be pushed into position to be engaged by one of the arms. Preferably each pin is under the control of an individual electromagnet. Except for the difficulty of placing all the pins and magnets in a sufficiently small space, one arm would suffice for the star piece. By the use of several arms it is possible to arrange the pins so that one selected pin will lie in the path of an arm in a way to give a precise predetermined amount of angular motion of the wheel.

The mechanism for selecting a particular pin is not shown, since it forms no part of the present invention.

After a particular pin (41F) is selected, the motor electromagnet 42F (Fig. 3) is then excited and pulls control rod 43F. This control rod is provided with two shoulders 44F and 45F and slides through an opening provided in the tail 46F of a pawl lever 47F. This lever pivots about a shaft 48F. When rod 43 begins to move, spring 49F pushes lever 47F and holds it against the stop member 44F. The pawl meshes with gear 37F, thus holding it stationary.

Rod 43F continues its travel. Its shoulder 50F pushes the end of a lever 51F bearing a pinion 40F. This lever turns about its shaft 52F and frees pinion 40F from gear 37F. Pinion 40F meshes then with an abutment member 53F which holds it in position.

Figure 5:
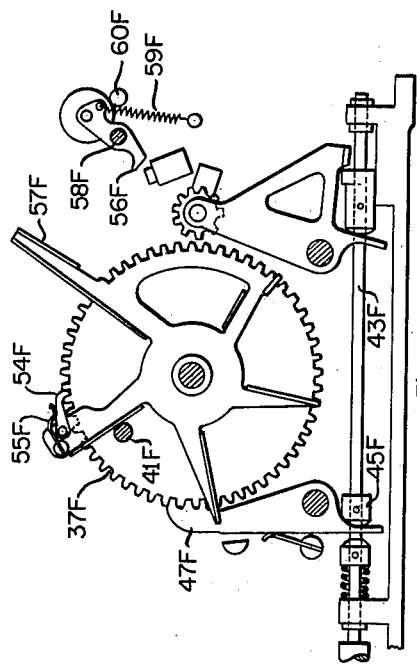

At the same time, star piece 38F, whose toothed sector 39F was meshed with pinion 40F, is also freed and moves counterclockwise under the impulse of a pre-wound spring (not shown) until one of its arms meets stop pin 41F (Fig. 5). At this moment rod 43F has finished its travel, and the shoulder 45F holds pawl 47F in mesh with gear 37F. A pawl 54F, which is normally held in engagement with the teeth of gear 37F by spring 55F, falls back into engagement with the gear 37F and prevents any possible bouncing back of the star piece 38F.

Figure 6:
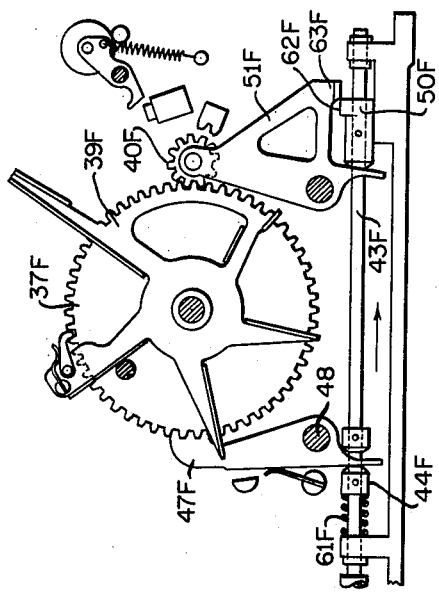

The mechanism remains in this position until the electromagnet 42F is released. At this moment rod 43F is returned by the action of spring 61F (Fig. 6). In the first part of this backward movement, the end 62F of shoulder 50F meets the end 63F of lever 51F and this lever rocks. Pinion 40F on lever 51F meshes at the same time with the gear 37F and with the toothed sector 39F of the star piece. Part 62F slides under part 63F and holds pinion 40F in position.

Figure 7:
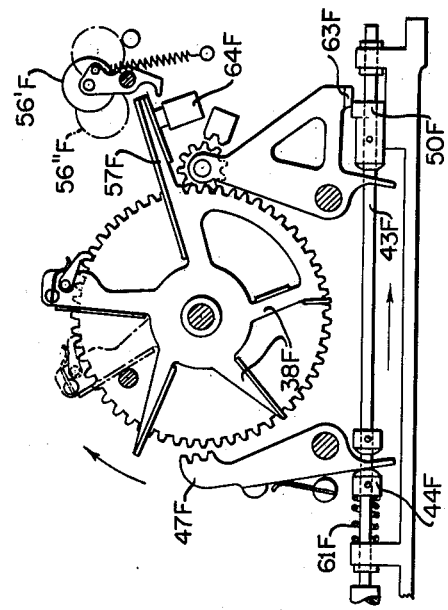

Near the end of its return motion, rod 43F frees pawl 47F from gear 37F (Fig. 7). At this moment the gear, urged by a pre-wound main spring (not shown), rotates clockwise and drives the star piece 38F until the part 57F comes against a stop member 65F. Gear 37F and star piece 38F move simultaneously, since they are both in mesh with pinion 40F. Thus in this motion, the wheel 37F measures off a precise angular motion determined by the position of the selected pin 41F in relation to the stop 64.

In order to take up the shock of stopping the parts, a damper 56F is provided. It comprises a member, which in the position of Fig. 3, is pushed back by the end 57F of the star piece 38F against the tension of a spring 59F. The damper is pivoted at 58F. The damper has a considerable mass. When the star piece leaves the stop 64F for its counter-clockwise movement (Fig. 5) the damper turns into engagement with an abutment 60F. On the clockwise motion of the star piece, the damper swings through position 56'F to 56"F (Fig. 7) back to its position of Fig. 3. The kinetic energy of the moving parts is dissipated in the damper.

A brief review of the operation will now be given. When a lateral motion of the carriage is called for following a photographic exposure, a pin 41F is pushed into the path of one of the arms of the star piece, depending on the amount of movement required. The pinion 40F is then moved out of mesh (Fig. 4) and the star piece is moved until one of its arms abuts the pin, the wheel 37F being then locked by the pawl 47F (Fig. 5). The wheel 37F and the star piece are then restored to operative connection by re-engagement of the pinion 40F (Fig. 6) and thereafter the pawl 47F is released (Fig. 7), thereby permitting the wheel to be turned through the precise measured angle. The motion of the wheel is transmitted through the gearing of Fig. 1 to turn the shaft 29F through a precise angle, and this motion is transmitted through the screw 17F to draw the carriage to the left by an exact amount.

These procedures are repeated for successive characters until after the entire line is photographed, after which the gears 37F and 19F are unmeshed so that the carriage is restored to its initial position for photographing a new line, the film then advanced by the sprocket to bring a new line into position.

Having thus described the invention, we claim:

1. A drive for a movable carriage comprising a rotatable shaft, gearing to rotate the shaft, a screw rotated by the shaft to advance the carriage, means for operating the gearing a definite amount to advance the carriage through an accurately predetermined distance, bearings for the shaft, and a spring thrust member for one end of the shaft to take up the inertial force due to stopping of the carriage without imparting a component of force to the gearing.

2. A drive for a movable carriage comprising a rotatable shaft, gearing to rotate the shaft, a screw rotated by the shaft to advance the carriage, means for operating the gearing a definite amount to advance the carriage through an accurately predetermined distance, bearings for the shaft, a sliding mount for one bearing, and a spring acting on said amount in opposition to the inertial force due to stopping of the carriage.

3. A drive for a movable carriage comprising a rotatable shaft, gearing to rotate the shaft, a screw rotated by the shaft to advance the carriage, means for operating the gearing a definite amount to advance the carriage through an accurately predetermined distance, bearings for the shaft including two bearings having surfaces oppositely inclined to the axis of the shaft, and an elastic thrust member for one of said bearings to take up the inertial force due to stopping of the carriage without imparting a component of force to the gearing.

4. A drive for a movable carriage comprising a rotatable shaft, gearing to rotate the shaft, a screw rotated by the shaft to advance the carriage, means for operating the gearing a definite amount to advance the carriage through an accurately predetermined distance, bearings for the shaft, a sliding mount for one bearing having frictional contact with a sleeve, and a spring acting on said mount in opposition to the inertial force due to stopping of the carriage.

5. A drive for a movable carriage comprising a rotatable shaft, gearing to rotate the shaft, a screw rotated by the shaft to advance the carriage, means for operating the gearing a definite amount to advance the carriage through an accurately predetermined distance, bearings for the shaft including two bearings having surfaces oppositely inclined to the axis of the shaft, a sliding mount for one of said bearings having frictional contact with a sleeve, and a spring acting on said mount in opposition to the inertial force due to stopping of the carriage.

RENÉ GRÉA.
RENÉ HIGONNET.
LOUIS M. MOYROUD.

References Cited in the file of this patent
UNITED STATES PATENTS

| Number | Name | Date |
|---|---|---|
| 559,326 | Ellis | Apr. 28, 1896 |
| 635,957 | Fairfield et al. | Oct. 31, 1899 |
| 1,228,423 | Ellis et al. | June 5, 1917 |
| 2,111,410 | Stickney | Mar. 15, 1938 |
| 2,439,470 | Jackson | Apr. 13, 1948 |